(12) United States Patent
Clemente, Jr. et al.

(10) Patent No.: US 6,511,047 B1
(45) Date of Patent: Jan. 28, 2003

(54) APPARATUS FOR MAKING A PLURALITY OF BLOWN OPTICAL FIBER INSERTIONS INTO A DUCT

(75) Inventors: Kurt J. Clemente, Jr., Chesapeake, VA (US); Gary W Derby, Grafton, VA (US)

(73) Assignee: Newport News Shipbuilding and Dry Dock Company, Newport News, VA (US)

( * ) Notice: Subject to any disclaimer, the term of this patent is extended or adjusted under 35 U.S.C. 154(b) by 0 days.

(21) Appl. No.: 09/464,233

(22) Filed: Dec. 15, 1999

(51) Int. Cl.$^7$ ............................................. B65H 59/00
(52) U.S. Cl. ................................................... 254/134.4
(58) Field of Search ...................... 269/134.4, 134.3 R, 269/134.3 FT, 268; 226/25, 43, 178

(56) References Cited

U.S. PATENT DOCUMENTS

| | | | |
|---|---|---|---|
| 4,691,896 A | 9/1987 | Reeve et al. | |
| 4,796,970 A | 1/1989 | Reeve et al. | |
| 4,856,760 A | * 8/1989 | Frost et al. | ............... 254/134.4 |
| 4,948,097 A | 8/1990 | Reeve et al. | |
| 4,997,256 A | 3/1991 | Sano et al. | |
| 5,065,928 A | 11/1991 | Davey et al. | |
| 5,163,657 A | 11/1992 | Sano et al. | |
| 5,165,662 A | 11/1992 | Jenkins | |
| 5,169,126 A | 12/1992 | Reeve et al. | |
| 5,181,271 A | * 1/1993 | Jenkins | ..................... 254/134.4 |
| 5,263,686 A | 11/1993 | Sano et al. | |
| 5,328,155 A | 7/1994 | Sano et al. | |
| 5,358,218 A | 10/1994 | Terasawa et al. | |
| 5,645,267 A | 7/1997 | Reeve et al. | |
| 5,732,934 A | 3/1998 | Sano et al. | |
| 5,781,678 A | 7/1998 | Sano et al. | |
| 6,260,826 B1 | * 7/2001 | Guyot et al. | .............. 254/134.4 |
| 6,364,290 B1 | * 4/2002 | Barker | ..................... 254/134.4 |
| 6,409,155 B1 | * 6/2002 | Brown et al. | ............ 254/134.4 |

* cited by examiner

*Primary Examiner*—Robert C. Watson
(74) *Attorney, Agent, or Firm*—Joy L. Bryant

(57) ABSTRACT

By the present invention, a plurality of blown optical fiber insertions are made into a duct by employing the following method: first installing at least one fiber through the duct to a terminal; trapping the first fiber in place; and subsequently blowing at least one second fiber alongside the first trapped fiber through the duct to a terminal. In a preferred embodiment, a trap fitting is mounted onto an entry end of the duct to permit multiple insertions of blown optical fiber into a duct. The trap fitting comprises a fitting fixed into the duct downstream from a blow head; a passageway through a wall of the fitting; a cylindrical sleeve fixed to the exterior of the fitting over the passageway; and a plunger mounted in the cylindrical sleeve.

7 Claims, 4 Drawing Sheets

APPARATUS FOR MAKING A PLURALITY OF BLOWN OPTICAL FIBER INSERTIONS INTO A DUCT

FIELD OF THE INVENTION

The present invention is related to blown optical fiber. In particular, it is related to a method and apparatus for making a plurality of blown optical fiber insertions into a duct.

BACKGROUND OF THE INVENTION

The apparatus and method for installing optical fiber in ducts by blowing the fiber through the duct are well-known to those of skill in the art and are described in U.S. Pat. Nos. 4,691,896 to Reeve et al.; 5,065,928 to Davey et al.; 5,165,662 to Jenkins; 5,181,271 to Jenkins; and 5,645,267 to Reeve et al. all of which are hereby incorporated by reference. Practical application of these fiber insertion methods revealed that as the number of fibers increased, the difficulty in gathering, directing, and metering the fibers for insertion were greatly amplified. Solutions to these difficulties involving the bundling of fibers (U.S. Pat. No. 4,997,256 to Sano et al.) into a coherent group resulted in reduced insertion distances and an overall reduction in the beneficial loose-tube cabling characteristics of blown fiber. Other solutions involving an optical path joint member (U.S. Pat. No. 5,781,678 to Sano et al.) have proved impractical due to the risk of damaging the fibers, both during the re-entry and insertion steps. It was obvious, however, that by using the current methods, the capacity for fiber density of the conduit was not fully realized.

By the present invention, a trap fitting was developed that permits a fiber or fiber bundle to be trapped in a duct while permitting subsequent blowing of a second fiber or fibers alongside and past the first trapped fiber. Until this invention, the only fitting on the market related to blown optical fiber was that which is manufactured by the John Guest Company. This fitting is not used for the insertion of blown optical fiber but is instead a fitting used to block the path of the duct or constrict around an object within the duct. The fitting is a pneumatic connector fitting that has a constricting diaphragm disposed within. When the fitting is twisted, the diaphragm constricts around an object in the duct and blocks the passageway through the duct. Such a fitting would not be suitable for use in the present invention because there is no way to subsequently blow a second group of fibers alongside the trapped fiber and through the duct because the duct is blocked.

SUMMARY OF THE INVENTION

By the present invention, a method and apparatus have been developed that permit a plurality of insertions of optical fiber or fibers into a duct while minimizing the risk of optical fiber breakage. The method employs an apparatus comprising a trap fitting that is mounted onto a duct. The trap fitting comprises a fitting mounted onto the duct downstream of a blow head. There is a passageway through a wall of the fitting and a cylindrical sleeve fixed to the exterior of the fitting over the passageway. A plunger is mounted in the cylindrical sleeve. The plunger is used to trap a first fiber against the wall of the fitting while leaving a suitable pathway for a second fiber to be blown through the trap fitting and into and through the duct to a terminal.

A new method for making a plurality of blown optical fiber insertions into a duct is presented wherein at least one fiber is installed in a duct through to a terminal. The fiber is then trapped in place. At least one second fiber is then blown alongside the first fiber and through the duct to a terminal. The method may be repeated any number of times to deploy the number of optical fibers desired.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1:
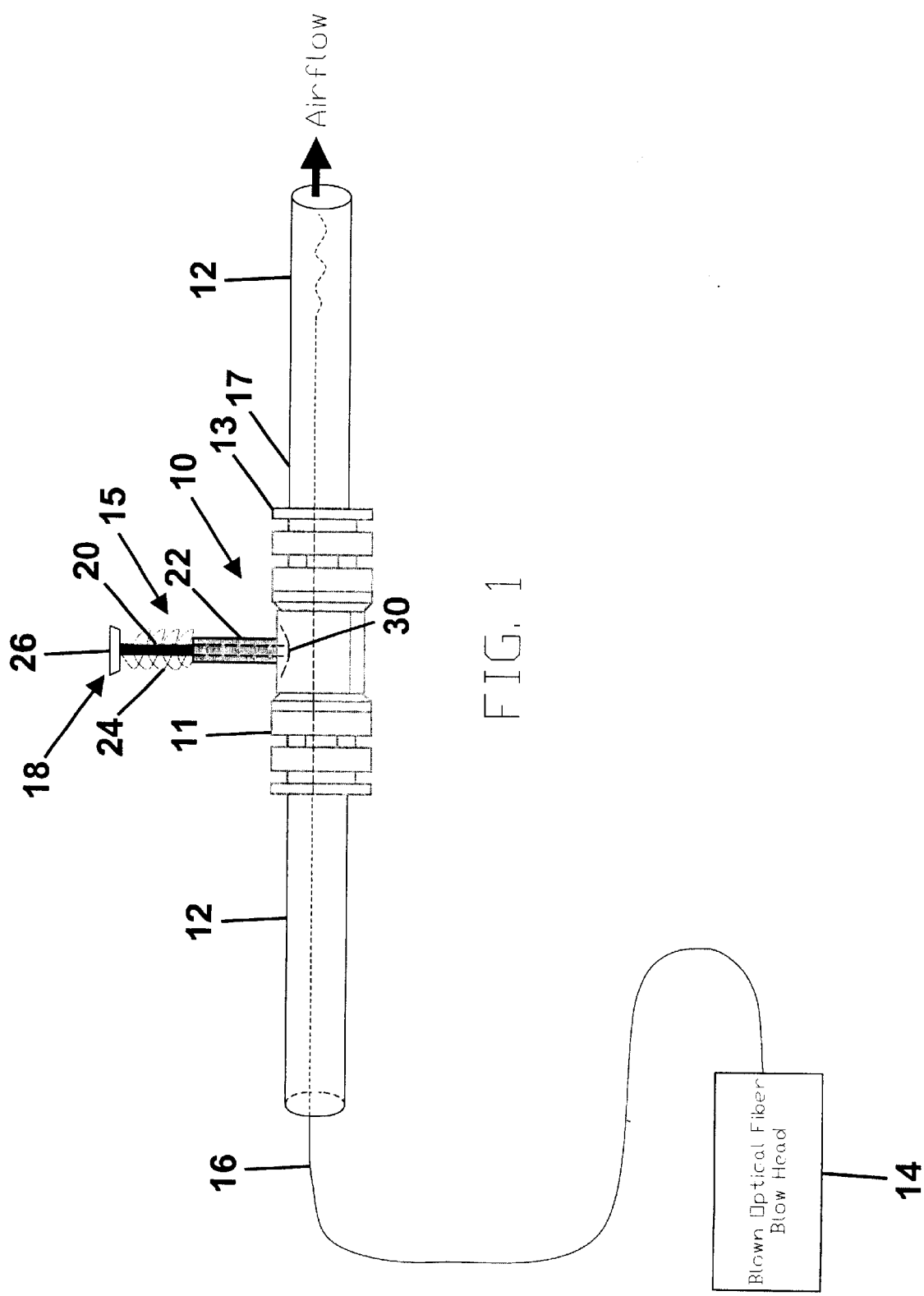
FIG. 1 depicts the apparatus of the present invention having a retracted trap plunger and a first fiber blown through a trap fitting.

Referring now to the drawings where similar elements are numbered the same throughout, FIG. 1 depicts the apparatus of the present invention that is used for making a plurality of blown optical fiber insertions into a duct. The primary element of the apparatus is a trap fitting 10 that is designed to connect to a standard optical fiber duct 12. The apparatus may further comprise a blow head 14 that is attached to an entry end 17 of the duct 12. The blow head 14 is a standard device known to those of skill in the art that is used for blowing optical fiber 16 through the duct 12. Although only one optical fiber is shown, it is understood that at least one optical fiber or a plurality of optical fibers may be blown into the duct at a single time.

Figure 2:
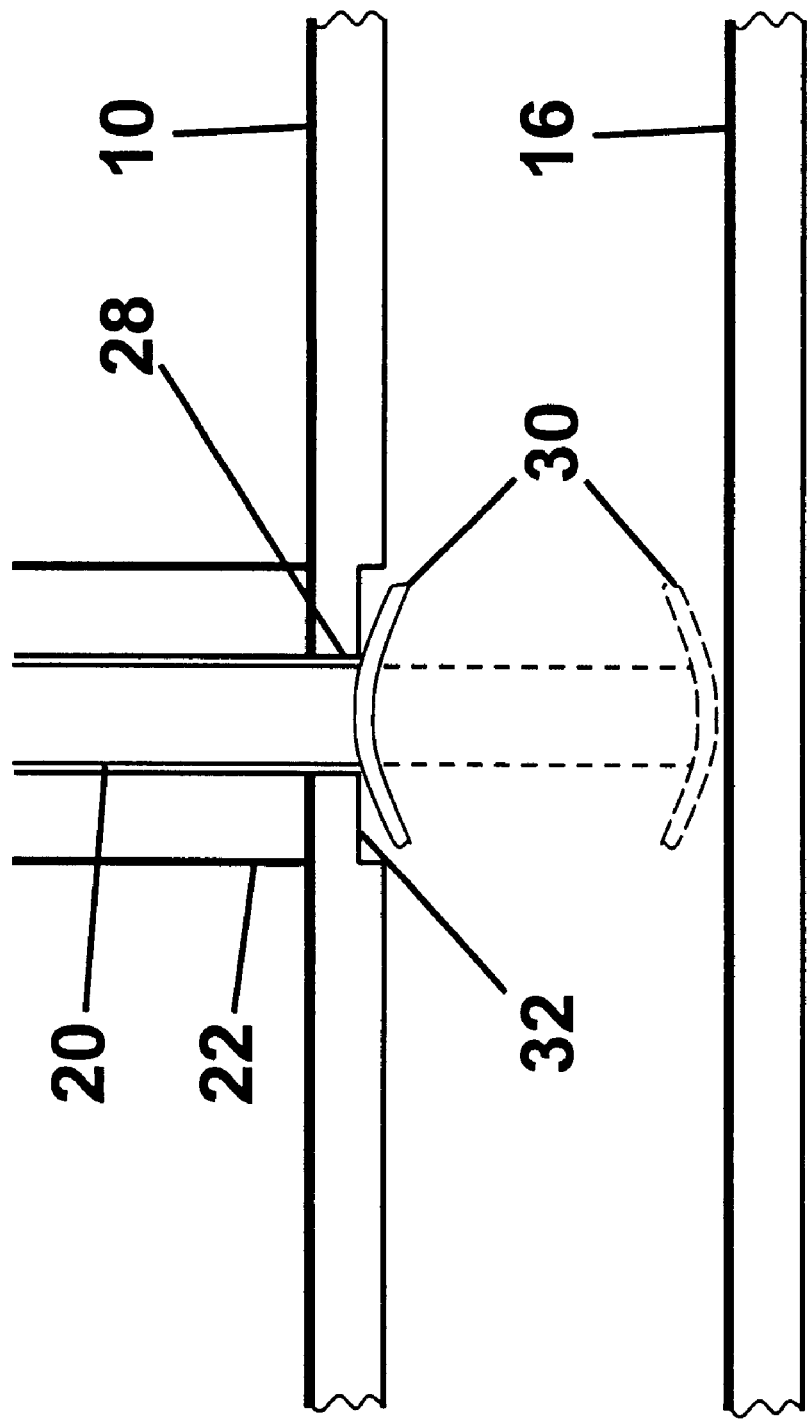
FIG. 2 is an enlarged section of an inner end of a trap plunger.
Figure 3:
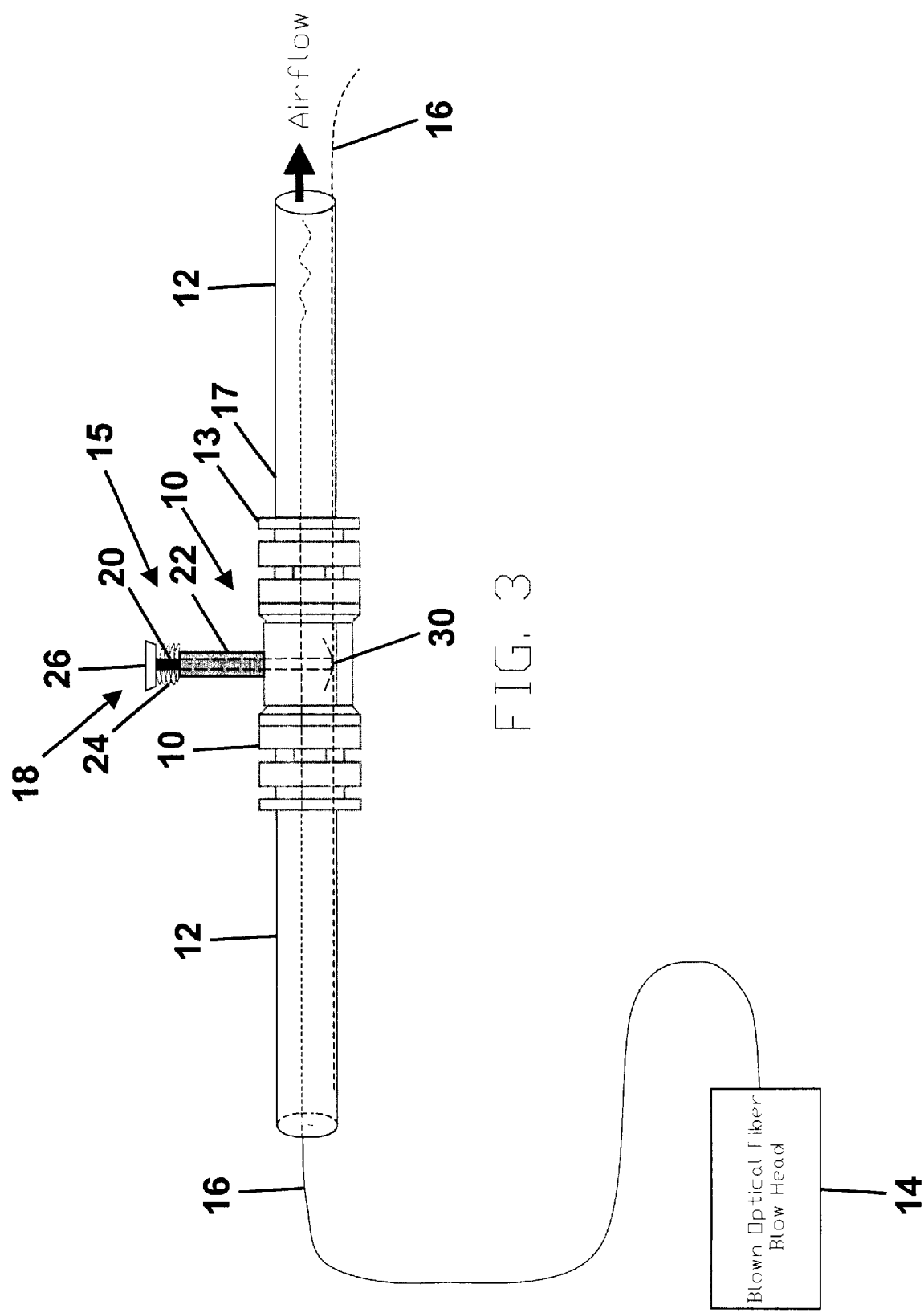
FIG. 3 depicts the apparatus of the present invention wherein a trap plunger is depressed to trap a first fiber against the wall of the trap fitting while a subsequent fiber is blown through the trap fitting.
Figure 4:
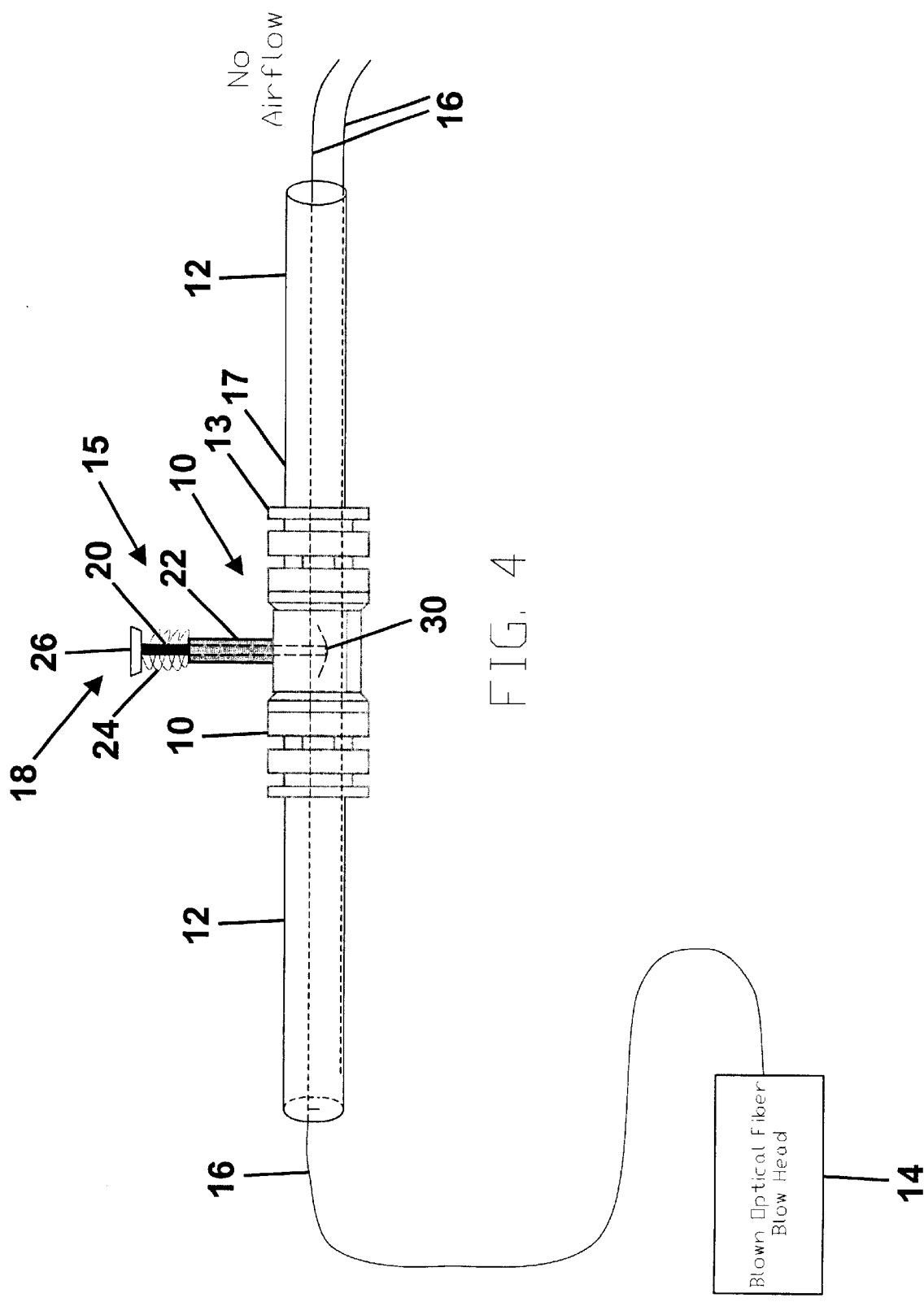
FIG. 4 depicts the apparatus of the present invention wherein a trap plunger is retracted with two groups of fiber in the trap fitting and wherein the blow head is disconnected.

The trap fitting 10 comprises a fitting fixed into the duct 12 downstream of the blow head 14. Alternatively, the trap fitting may be built into the blow head itself. There is a passageway 28 (FIG. 2) or opening through a wall of the fitting 10. A cylindrical sleeve 22 is fixed to the exterior of the fitting 10 over the passageway 28. The cylindrical sleeve 22 is fixed to the exterior of the fitting 10 by any means known to those of ordinary skill in the art such as cementing, welding, or molding it as a part of the fitting. A plunger 20 is mounted in the cylindrical sleeve 22. The plunger 20 passes through the cylindrical sleeve 22 and has a headed outer end 26 and an inner end terminating with a trap head 30. The plunger 20 may simply be a rod with no cylindrical sleeve 22, biasing member 24, or head 26 and, therefore, may not be fixed to the exterior of the fitting 10. However, preferably, a plunger biasing member 24 such as a helical compression spring is mounted between the head of the plunger 26 and the outer end of the cylindrical sleeve 22. The plunger biasing member 24 is used to bias the plunger 20 into a retracted position as shown in FIGS. 1 and 4. In an alternative embodiment, a latch member, for example a ratchet or a twist/lock mechanism (not shown), may be provided to latch the plunger 20 in its depressed position as shown in FIG. 3.

The trap head 30 has a convex side facing the wall of the fitting 10 opposite from the plunger 20. In one embodiment, the trap head 30 is attached to the inner end of the plunger 20 by any means known to those of ordinary skill in the art. In this embodiment, when the trap head 30 is in its inactive position, the trap head 30 is lodged in a recess 32 in a wall of the trap fitting 10 under the plunger 20 (FIG. 2).

In an alternative embodiment, the trap head 30 is separate from the plunger 20. In this instance, when the trap head 30 is in an inactive condition, it is held against a wall of the trap fitting 10 under the inner end of the plunger 20 such that the trap head 30 is lodged in a recess 32 in a wall of the trap fitting 10 under the plunger 20. The trap head 30 is pushed by the plunger 20 into contact with the fiber 16 therein. The trap head 30 returns to an inactive position when the plunger 20 is retracted. A spring may be provided in the perimeter of the trap head 30 to bias it into the position shown in solid line in FIG. 2. When the plunger 20 is depressed, the trap head 30 assumes the position shown in dashed line in FIG. 2. The recess 32 permits the trap head 30 to clear the lumen of the trap fitting 10. This permits the maximum number of fibers to pass into the trap fitting 10 and through to the duct 12.

The trap head 30 is prepared from a relatively soft, pliable elastomeric material such as nylon, rubber, or polytetrafluoroethylene. This type of material reduces damage to the optical fibers as they are trapped against the wall of the trap fitting.

In the alternative, the attachment comprises a T-shaped fitting 10 having a first branch 11 for receiving optical fiber 16. A second branch 13 is used for delivering optical fiber 16 to a duct 12. A third branch 15 has a trapping device (shown as a plunger assembly 18) disposed therein. The trapping device 18 comprises a spring-loaded plunger 20 mounted in the third branch 15. A trap head 30 is positioned at an inner end of the plunger 20. The trap head 30 is fixed to the inner end of the plunger 20 and lodges in a recess 32 in a wall of the T-shaped fitting 10 under the plunger 20. Alternatively, the trap head 30 is separate from the plunger 20 and is biased into a position in a recess 32 of a wall of the T-shaped fitting 10 under the plunger 20.

When making a plurality of blown optical fiber insertions into a duct according to the present invention, at least one fiber 16 is first installed in the duct 12 to a terminal (not shown). The method of installation may be any method known to those of ordinary skill in the art and may take place at any previous time. The first fiber 16 is trapped in place. Subsequently, at least one second fiber 16 is blown through the duct 12 alongside the first trapped fiber to a terminal (not shown). The trapping step and subsequent blowing of more fibers 16 through the duct 12 to a terminal (not shown) may be repeated at least one time to fill the duct with the desired number of fibers (preferably more than 8 fibers).

In a further embodiment of the method, a trap fitting 10 is mounted onto an entry end 17 of the duct 12. The duct 12 may already have a fiber 16 in it or it may be empty. If the duct 12 is empty, a first fiber or group of fibers may be installed by blowing or any other method. A second fiber is blown through the trap fitting 10 and into and through the duct 12 to a terminal (not shown). The first fiber is trapped in the trap fitting 10 while the second fiber is blown alongside the first trapped fiber through the trap fitting 10 and into and through the duct 12 to a terminal (not shown). The trap fitting 10 is that which has been previously described. Thus, the trapping step comprises moving the plunger 20 perpendicular to the trap fitting 10 until the trap head 30 contacts the first fiber and traps the first fiber against the wall of the trap fitting 10 while the second fiber is blown alongside the first trapped fiber through the trap fitting 10 and into and through the duct 12 to a terminal (not shown). When the operation is complete, the trap fitting 10 is removed from the duct 12.

FIG. 1 depicts a preferred embodiment of the method and apparatus where the trap fitting 10 having a plunger assembly 18 is mounted on the end of a fiber duct 12. There is already a fiber 16 in the duct 12. The trap fitting 10 is positioned downstream of the blow head 14 or it could be part of the blow head. Another length of duct 12 may be inserted between the trap fitting 10 and the blow head 14. The arrow in the figure shows the direction of airflow in the duct 12 and in the trap fitting 10. Regardless of whether the fiber 16 was recently blown into the duct 12 or was already present when the trap fitting 10 was installed, the plunger 20 is depressed (FIG. 3) in the trap head 30, trapping the previously inserted fiber 16 against the opposite wall of the trap fitting 10. Next, a second fiber or group of fibers is blown alongside the first trapped fiber, through the trap fitting 10, past the plunger 20 and trap head 30, into the duct 12 to the designated terminal. If another group of fibers is to be blown into the duct 12, the plunger is retracted (FIG. 4). It may be necessary to ensure that no fibers have been caught between the top of the top of the trap head and the wall of the trap fitting 10. This may be achieved by any method known to those of ordinary skill in the art and more specifically by depressing the plunger 20 part-way to ensure that no fibers are trapped; removing the trap fitting 10 from the duct 12 and manipulating the fibers so they are at the bottom of the trap fitting 10; and remounting the trap fitting 10 on the duct 12. The plunger 20 is depressed again and the blowing operation repeated for the next fiber.

As stated earlier, the blowing operation is known to those of ordinary skill in the art. However, the method and apparatus of the present invention permits the blowing operation to be repeated at least one time to maximize the storage or holding capacity of the duct. (It should be noted that the method and apparatus described herein may be applied to any case of blowing articles of indefinite length through ducts.) When the trap fitting is employed, it will remain in place until the blowing operation is complete. At that time, the trap fitting may either be removed or dismounted from the duct or left in place if it is expected that more fibers would be blown into the duct at a later time.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. An apparatus for making a plurality of blown optical fiber insertions into a duct, the apparatus comprising:
   a blow head attached to an entry end of the duct;
   a trap fitting mounted onto the duct, wherein the trap fitting comprises:
   a fitting fixed into the duct downstream of the blow head;

a passageway through a wall of the fitting;

a cylindrical sleeve fixed to the exterior of the fitting over the passageway;

a plunger mounted in the cylindrical sleeve, wherein the plunger has a headed outer end and an inner end terminating with a trap head; and a helical compression spring mounted around the plunger and positioned between the head of the plunger and an outer end of the cylindrical sleeve.

2. An apparatus for making a plurality of blown optical fiber insertions into a duct, the apparatus comprising:

a blow head attached to an entry end of the duct;

a trap fitting mounted onto the duct, wherein the trap fitting comprises:

a fitting fixed into the duct downstream of the blow head;

a passageway through a wall of the fitting;

a cylindrical sleeve fixed to the exterior of the fitting over the passageway; and a plunger mounted in the cylindrical sleeve, wherein the plunger has a headed outer end and an inner end terminating with a trap head, wherein the trap head has a convex side facing the wall of the fitting opposite the plunger.

3. An apparatus for making a plurality of blown optical fiber insertions into a duct, the apparatus comprising:

a blow head attached to an entry end of the duct;

a trap fitting mounted onto the duct, wherein the trap fitting comprises:

a fitting fixed into the duct downstream of the blow head;

a passageway through a wall of the fitting;

a cylindrical sleeve fixed to the exterior of the fitting over the passageway; and a plunger mounted in the cylindrical sleeve, wherein the plunger has a headed outer end and an inner end terminating with a trap head, wherein the trap head has a convex side facing the wall of the fitting opposite the plunger; and wherein the trap head in an inactive condition is held against a wall of the trap fitting under the inner end of the plunger, is pushed by the plunger into contact with the fiber therein, and returns to an inactive position when the plunger is retracted.

4. An apparatus according to claim 2, wherein the trap head is attached to the inner end of the plunger.

5. An apparatus according to claim 3, wherein in its inactive position, the trap head is lodged in a recess in a wall of the trap fitting under the plunger.

6. An apparatus for making a plurality of blown optical fiber insertions into a duct, the apparatus comprising:

a blow head attached to an entry end of the duct;

a trap fitting mounted onto the duct, wherein the trap fitting comprises:

a fitting fixed into the duct downstream of the blow head;

a passageway through a wall of the fitting;

a cylindrical sleeve fixed to the exterior of the fitting over the passageway; and a plunger mounted in the cylindrical sleeve, wherein the plunger has a headed outer end and an inner end terminating with a trap head, wherein the trap head has a convex side facing the wall of the fitting opposite the plunger and the trap head is attached to the inner end of the plunger; wherein in its inactive position the trap head is lodged in a recess in a wall of the trap fitting under the plunger.

7. An apparatus for making a plurality of blown optical fiber insertions into a duct, the apparatus comprising:

a duct for fibers, the duct having an entry end;

a trap fitting mounted to the entry end of the duct, the trap fitting comprising a fitting mounted in line with the duct wherein the fitting has a spring-loaded plunger mounted in a wall of the fitting for linear motion perpendicular to the fitting, the plunger terminating with a trap head, the trap head having a convex side facing a wall opposite the plunger; and a blow head mounted upstream from the trap fitting.

* * * * *